United States Patent

[11] 3,598,015

| [72] | Inventors | John Delistovich<br>Jersey City;<br>Edward J. Golden, Hamburg; Roger J.<br>Talish, Fairfield; Kenneth J. Urgovitch,<br>Clifton, all of, N.J. |
|---|---|---|
| [21] | Appl. No. | 812,735 |
| [22] | Filed | Apr. 2, 1969 |
| [45] | Patented | Aug. 10, 1971 |
| [73] | Assignee | The Bendix Corporation |

[54] MIXED POD ROCKET RELEASE SYSTEM
6 Claims, 13 Drawing Figs.

[52] U.S. Cl. ................................................ 89/1.814,
89/1.5
[51] Int. Cl. ................................................ F41f 5/02
[50] Field of Search .......................................... 89/1, 15,
1.814, 1.816, 1.817, 1.812; 317/80

[56] References Cited
UNITED STATES PATENTS

| 2,421,893 | 6/1947 | Lambert et al. | 89/1.814 X |
| 2,488,228 | 11/1949 | Nims et al. | 89/1.814 X |
| 2,845,004 | 7/1958 | Johnson | 89/1.815 |
| 2,936,676 | 5/1960 | Robert et al. | 89/1.817 |
| 3,064,537 | 11/1962 | Baller et al. | 89/1.814 |
| 3,274,348 | 9/1966 | Blomquist et al. | 89/1.8 X |
| 3,396,628 | 8/1968 | Nash | 89/1.814 |
| 3,453,496 | 7/1969 | Wright et al. | 89/1.814 |
| 3,499,363 | 3/1970 | Lauro | 89/1.814 X |

*Primary Examiner*—Samuel W. Engle
*Attorneys*—S. H. Hartz and Plante, Arens, Hartz, Hix and Smith ABSTRACT: A rocket release system, for an aircraft, having rocket pods randomly loaded with mixed rocket types and having provisions for selecting the type, release mode and quantity of rockets to be released. The rocket release is programmed so that the weapons remain balanced on each side of the aircraft and only safe combinations of rockets may be released. A continuous display of rocket inventory is provided along with a warning when the inventory of a particular type of rocket is depleted.

Patented Aug. 10, 1971

INVENTORS
JOHN DELISTOVICH
EDWARD J. GOLDEN
BY ROGER J. TALISH
KENNETH J. URGOVITCH

ATTORNEY

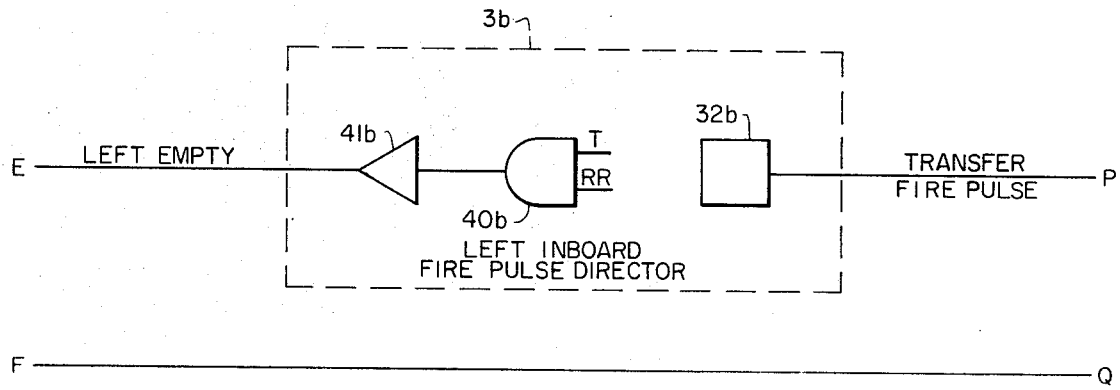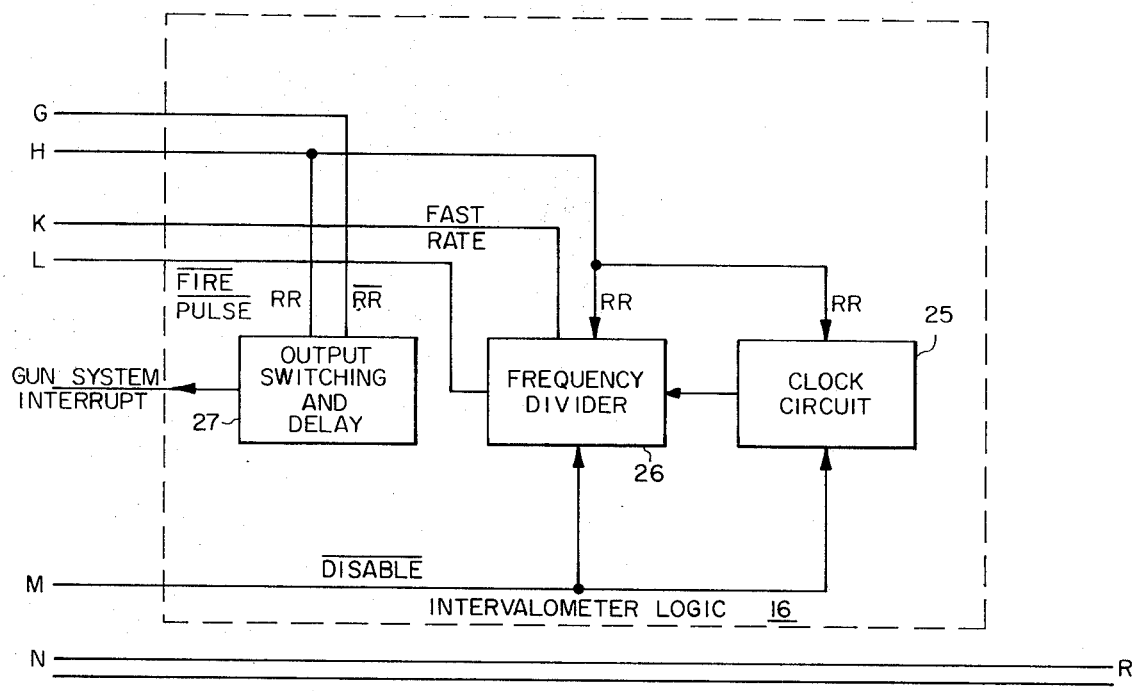
FIG.4C

Patented Aug. 10, 1971 3,598,015

INVENTORS
JOHN DELISTOVCH
EDWARD J. GOLDEN
BY ROGER J. TALISH
KENNETH J. URGOVITCH

ATTORNEY

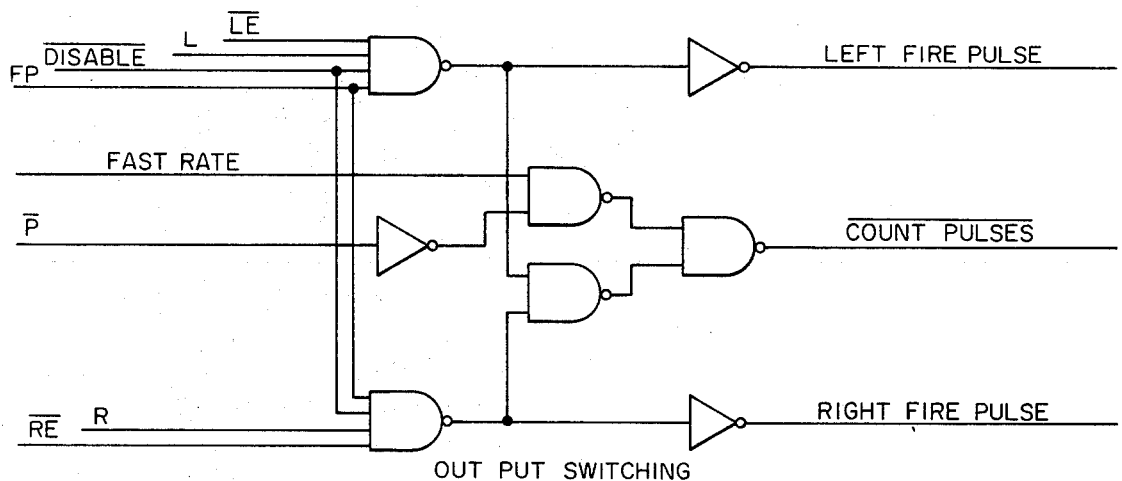
FIG. 8 OUT PUT SWITCHING
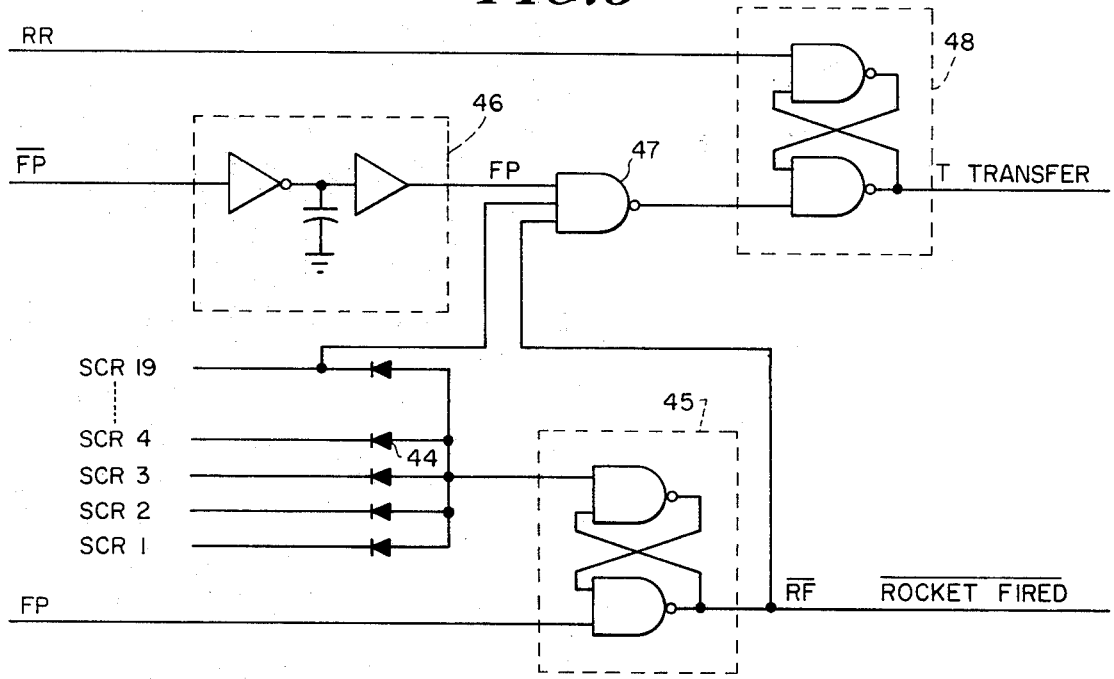
FIG. 9 ROCKET FIRED DETECTOR AND TRANSFER CIRCUIT
| A | B | C | No.ROCKETS |
|---|---|---|---|
| O | O | O | 1 |
| 1 | O | O | 2 |
| O | 1 | O | 3 |
| 1 | 1 | O | 4 |
| O | O | 1 | 6 |
| 1 | O | 1 | 7 |
| O | 1 | 1 | 14 |
| 1 | 1 | 1 | ALL |
FIG. 10
INVENTORS
JOHN DELISTOVICH
EDWARD J. GOLDEN
BY ROGER J. TALISH
KENNETH J. URGOVITCH
ATTORNEY

MIXED POD ROCKET RELEASE SYSTEM

BACKGROUND OF THE INVENTION

1. Field of the Invention

This invention relates to a rocket release system and more particularly to a system having mixed loaded rocket pods.

2. Description of the Prior Art

Heretofore rocket release systems were controlled by electromechanical stepping devices resulting in a fixed sequence in which the rockets had to be fired. Rockets could be mixed loaded; however, they could not be selectively fired because of the fixed sequence of the electromechanical stepping device. It was therefore necessary to load the rockets in the expected sequence of use and if a certain type rocket was required before its expected sequence it was necessary to release all the previous sequenced rockets to arrive at the required rocket. In the prior art rockets were released from one rocket pod at a time thus a pod on one side of the aircraft would be empty while a pod on the other side would be fully loaded creating an unbalance in the aircraft.

SUMMARY OF THE INVENTION

The present invention contemplates a mixed pod rocket release system having a solid state intervalometer, director and priority register allowing the system to release a desired rocket type irrespective of its pod position. The invention provides for random loading of rocket pods with different types of rockets. The priority register will select the desired rocket and the system will release the rockets at a rate established by the intervalometer until a desired quantity has been released or until the inventory of the selected rocket is depleted. The rockets may be released either in a single or a pairs mode as long as rockets of the selected type are available on each side of the aircraft. The system provides a display of the rocket inventory for each of the types of rockets and the display is continually down counted as each additional rocket is released. The system provides an interlock responsive to the rocket selection and mode selection to prevent the release of an unsafe combination of rockets. The system will distribute rocket fire pulses to alternate sides of the aircraft thus maintaining rocket valance. The system also has provisions for jettisoning all the rocket pods.

One object of the invention is to provide a solid state stepping device for a rocket release system.

Another object of the invention is to provide for mixed loading of rocket pods.

Another object of the invention is to provide for random loading of different rocket types.

Another object of the invention is to provide for selection of a rocket type, delivery mode and quantity of rockets to be released.

Another object of the invention is to provide for jettisoning the rocket pods.

Another object of the invention is to provide a display showing the remaining rocket inventory.

Another object of the invention is to provide a system adaptable to numerous types of aircraft.

Another object of the invention is to provide a system adaptable to either 7 or 19 round rocket pods.

Another object of the invention is to prevent the release of unsafe combinations of rockets.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE DRAWINGS

FIGS. 4A to 4D show a detailed block diagram of the entire system constructed in accordance with the present invention.

FIG. 8 is a logic diagram of an output switching circuit shown in FIG. 4.

FIG. 9 is a logic diagram of a rocket fire and transfer detector shown in FIG. 4.

FIG. 10 is a table showing a conversion from a binary code to a rocket quantity.

DESCRIPTION OF THE INVENTION

Figure 1:
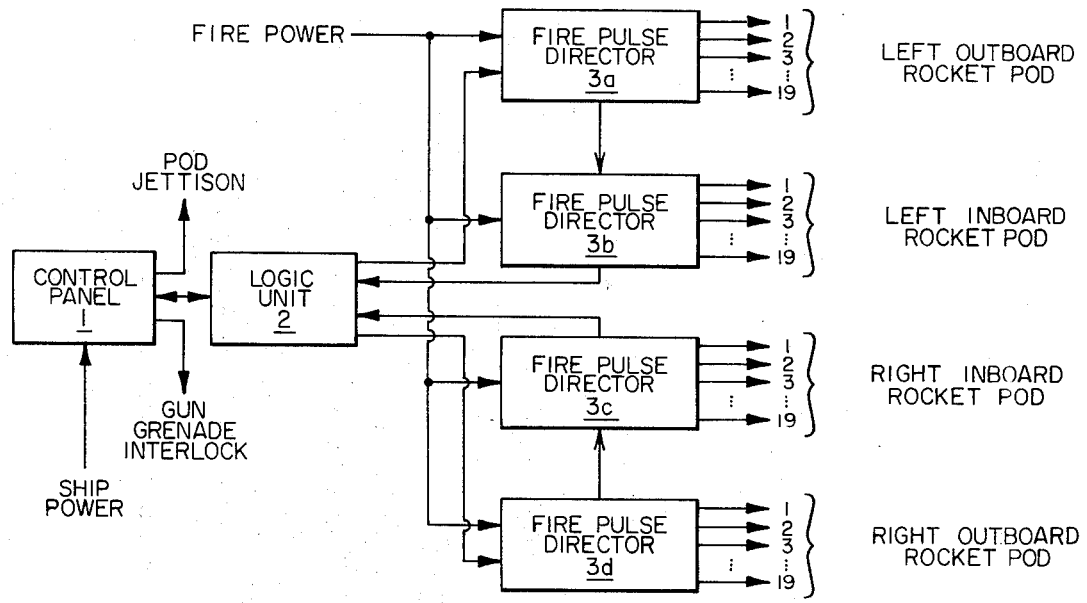
FIG. 1 is a block diagram of a system constructed in accordance with the present invention.

Referring to Figure 1 there is shown a block diagram of the system having a control panel 1 located within the aircraft cockpit, a logic unit 2 located within the aircraft fuselage and fire pulse directors 3a to 3d located under the wings. There may be two or four fire pulse directors depending upon aircraft configuration. Digital signals of either one or zero are used throughout the system. When the signals are transmitted between the parts of the system shown in FIG. 1 the signals are either 0 or 28 volts DC corresponding to a zero or one level. The logic unit also provides count pulses to the control panel for counting down a weapon inventory indicator on the control panel.

The fire pulse directors route rocket fire pulses to selected rockets in the associated rocket pod and provide signals indicating if the selected rockets are depleted from the associated pod.

Figure 2:
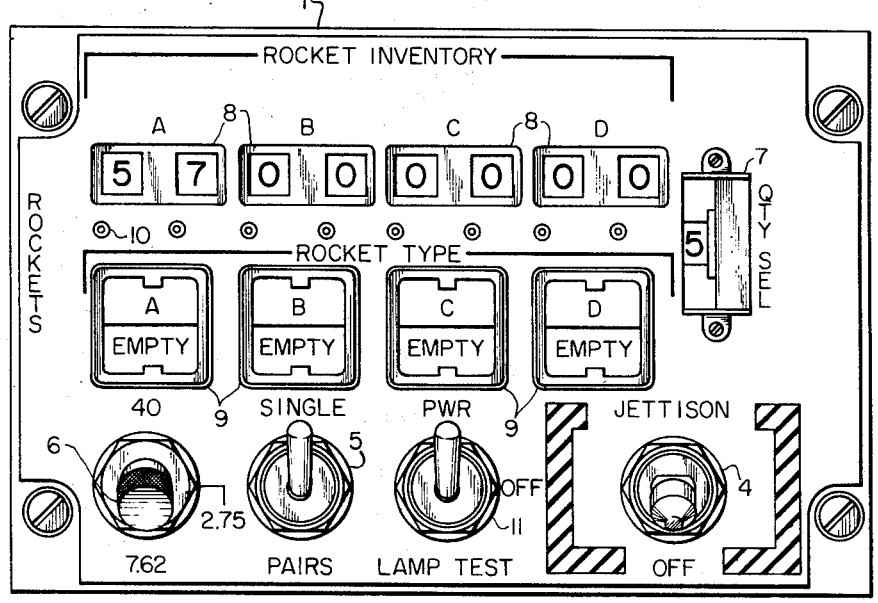
FIG. 2 shows a control panel for use with the system shown in FIG. 1.

Referring to FIG. 2 there is shown a control panel 1 constructed in accordance with the present invention. A toggle switch 11 is provided to turn on system power and to test control panel lamps. In a middle position system power is off and in an upper position the system power is on, in a lower position power is applied to all control panel lamps. A switch 4 is provided to initiate the jettison signal to the rocket pods. An off position is provided with a positive lock to prevent an inadvertent switching to the upper jettison position.

A switch 5 is provided to select either a single or pairs mode of rocket firing, in an upper position rockets are fired singly and in a lower position rockets are fired in pairs. A switch 6 is provided to select a weapons system, in an upper position a grenade system is selected, in a lower position a gun system is selected and in a middle position the rocket system is selected. When the rocket system is selected a gun and grenade interlock signal is provided to prevent the firing of either the gun or the grenade system during rocket firing. A thumbwheel type switch 7 is provided to select one of eight predetermined quantities of weapons to be fired. The available quantities are 1, 2, 3, 4, 6, 7, 14, and all rockets. Four rocket quantity counters 8 are provided for displaying the quantity of each rocket type available or remaining in the system. Knobs 10 are provided to set the rocket counter to the proper initial inventory. Four push button type switches 9 are provided for selecting a rocket type, one for each rocket type. Each switch has a holding coil to maintain the selection. Subsequent selection of another rocket type causes deselection of a previously selected type. The faces of the switches have split screens one half has a weapon designation which is illuminated when the switch is activated the other half has an empty legend which lights when the associated rocket counter reads zero.

Figure 3:
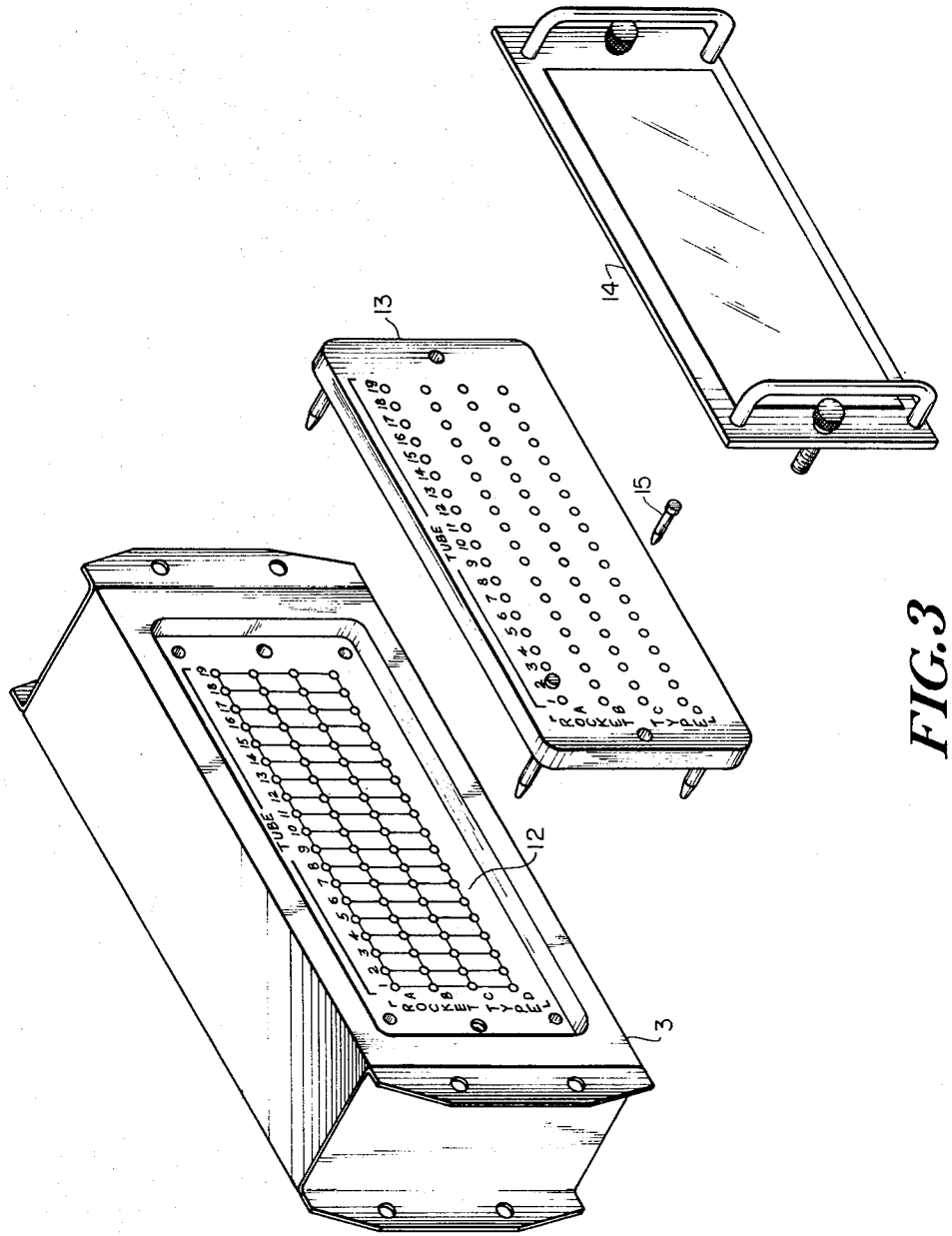
FIG. 3 shows a fire pulse director for use with the invention shown in FIG. 1.

Referring to FIG. 3 there is shown a fire pulse director 3 constructed according to the present invention. The basic function of the fire pulse director is to sequentially distribute fire pulses to the selected type rockets. The fire pulse director has a matrix 12 having an input for each of the rocket types and 19 outputs, one for each tube of a rocket pod. Selector pins 15 are used to connect the input corresponding to the type of rocket in a tube to the tube output. A removably programming board 13 is provided to hold the selector pins. The board may be programmed with selector pins at the pod loading area and when the pod is mounted on aircraft the programming board is inserted into the fire pulse director to make the required matrix connections. A cover 14 is provided to hold the programming board and selector pins in place.

Referring to FIGS. 4A to 4D there is shown a block diagram of the entire system including the control panel, a left outboard fire pulse director 3a, a portion of a left inboard fire pulse director 3b and the logic unit 2 which is divided into three separate logics, a quantity logic 18 an intervalometer logic 16, and a station logic 17. All fire pulse directors are of similar construction so only one director is shown for purposes of description. A portion of a second director is shown to illustrate interconnection of the directors and transfer of the fire pulses from an outboard to an inboard fire pulse director. Two similar directors are used for the right side of the aircraft.

Figure 4A:
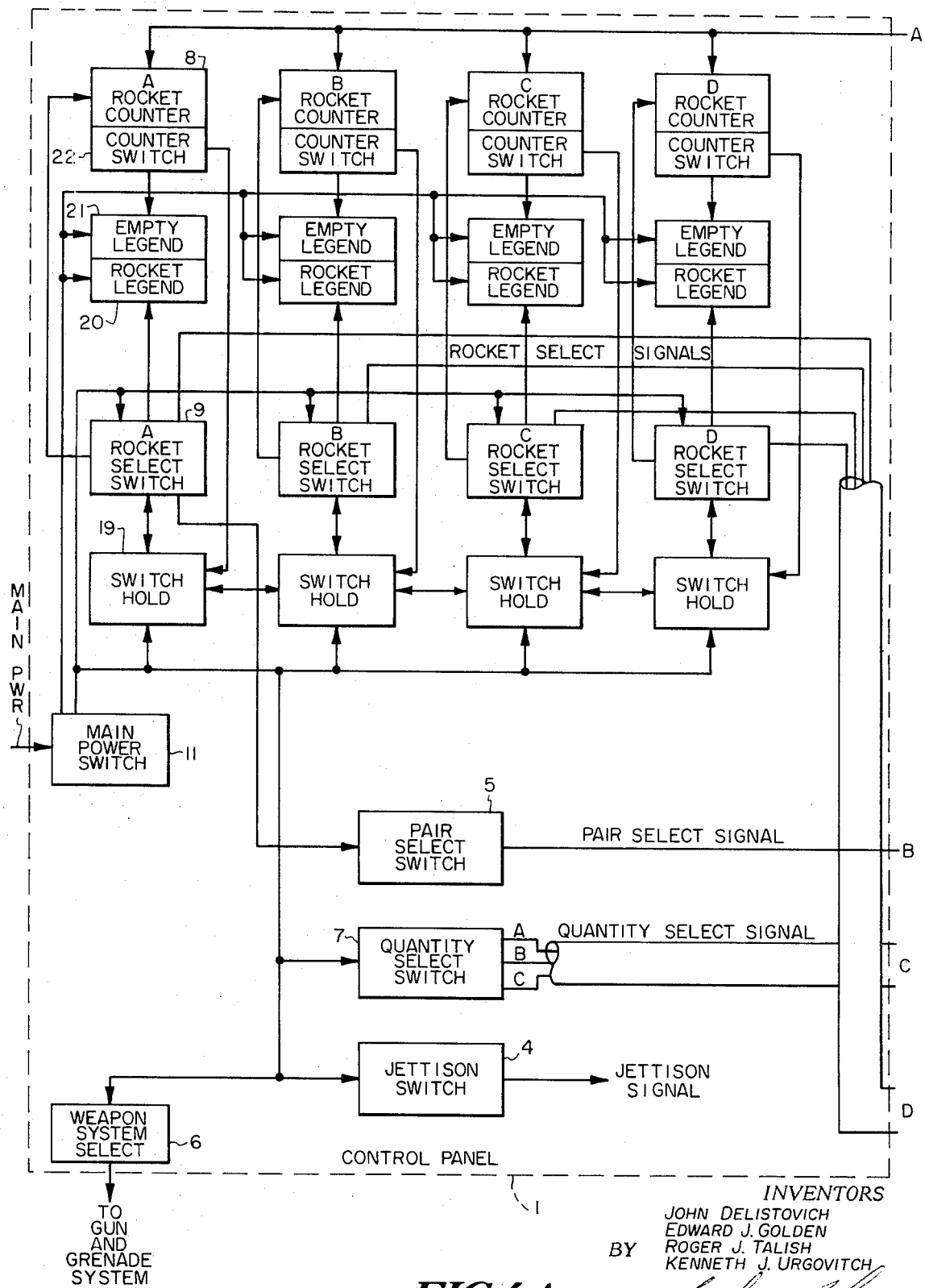

Referring to FIG. 4A the main power switch 11 receives the main power from the aircraft and provides power to rocket select switches 9, switch hold circuits 19, rocket legends 20, empty legends 21, jettison switch 4 and the weapon system selection switch 6. Rocket select switches 9 have outputs connected to corresponding switch hold circuits, rocket legend circuits and to the rocket select relays 43 in the fire pulse directors. Activation of a rocket select switch 9 causes a signal to be provided to the associated hold circuit 19 thereby allowing the hold circuit to be energized and to maintain the rocket select switch in the activated position. The switch hold circuits 19 are interconnected to release a previously activated rocket switch when a new rocket is selected. The rocket select switch provides another output to the associated rocket legend 20 causing the rocket legend to be illuminated. Rocket select switch 9 provides a 28 volt DC signal to the appropriate rocket select relay 43. The rocket select switch 9 also provides an enabling signal to the corresponding rocket counter 8 to allow the rocket counter to count down. Rocket counters 8 are responsive to rocket count pulses supplied by the station logic 17. The pulses step the counter down from a preset quantity to a zero count. The rocket counters 8 are physically connected to counter switches 22 which are responsive to a zero reading on the rocket counter for providing an output signal to the empty legend 21 and switch hold circuits 19 causing the empty legend to be illuminated and the switch hold circuits to release the rocket select switch. When the pair select switch 5 is set for single mode it provides a signal of 0 volts DC to the station logic 17. When the pair select switch is in the pairs position a plus 28 volt DC signal is provided to the station logic. The pair select switch receives the 28 volt DC signal from the rocket select switches for those rockets that may be fired safely only in the single mode. When the rocket select switch is activated for a rocket that may be fired safely only in the single mode the 28 volt DC signal to the pair select switch is cut off allowing only a 0 volt DC signal or a single mode signal to be provided by the pairs select switch.

The quantity select switch 7 receives power from the main power switch and provides output signals to the quantity logic 18. The quantity select signal provided by the quantity select switch is in the form of a 4-2-1 binary code having levels of 0 and 28 volts DC and is passed on three parallel lines A, B, and C. Referring to FIG. 10 there is shown a table for converting the binary code into a selected rocket quantity. The weapon system select switch 6 provides a signal to the gun and grenade systems to prevent firing of the gun and grenade weapon system when the rocket weapon system is in use. The jettison switch 4 provides a 28 volt DC jettison signal to the rocket pods when activated.

Figure 4B:
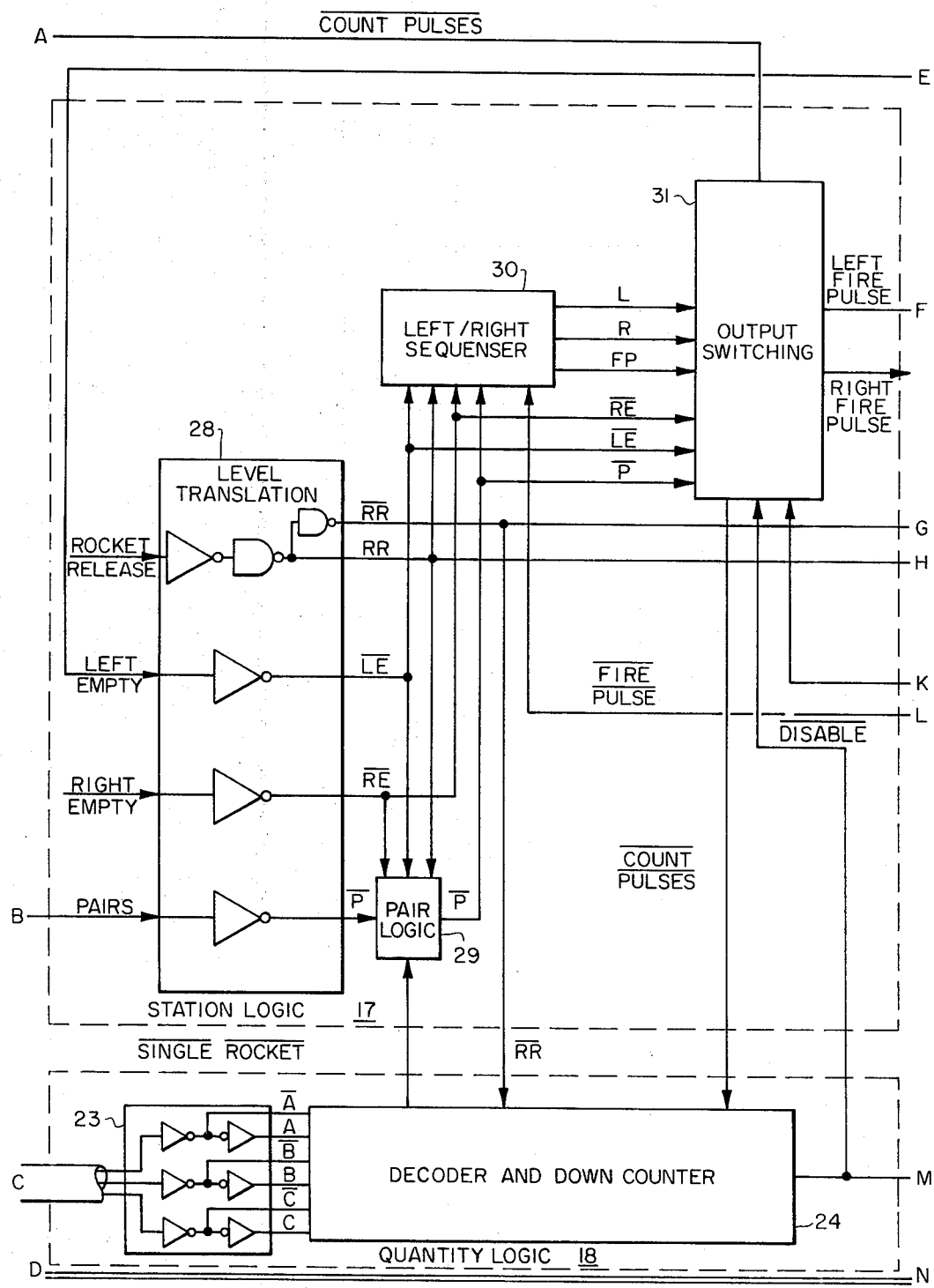

Referring to FIG. 4B the quantity logic 18 receives the 4-2-1 binary signal from the quantity select switch 7 in the control panel. A level translation circuit 23 receives the 4-2-1 binary quantity signal and provides a signal corresponding to the complement of the quantity signal. A decoder and down counter circuit 24 as shown in FIG. 5 receives the signals from the level translation circuit 23, a signal $\overline{RR}$ corresponding to the complement of a rocket release signal RR and count pulses from the station logic for down counting the quantity signal and providing a single rocket signal when the quantity is one and a disable signal when the quantity is zero.

Figure 5:
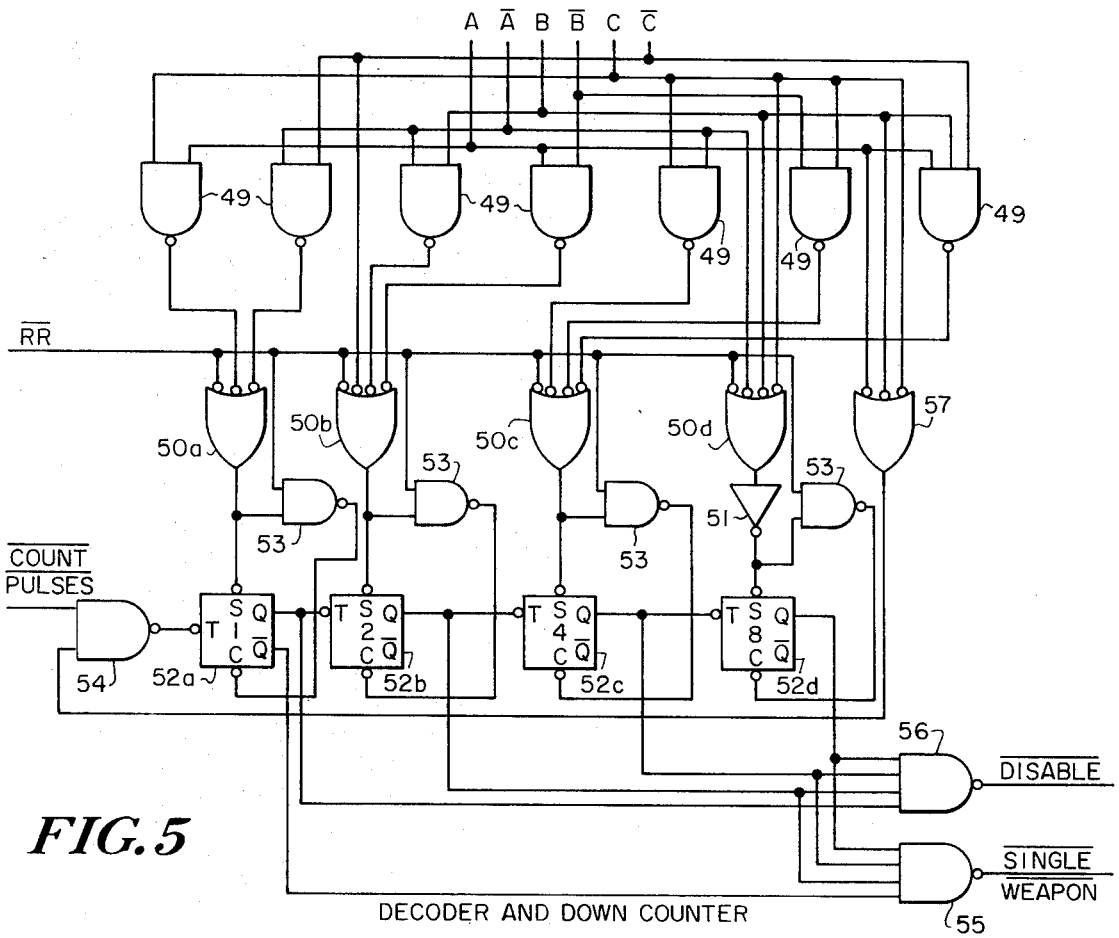
FIG. 5 is a logic diagram of a decoder and down counter circuit shown in FIG. 4.

Referring to FIG. 5 there is shown a decoder and down counter circuit 24 used in the quantity logic 18. The circuit receives the A, B, and C signals and their complements $\overline{A}$, $\overline{B}$, and $\overline{C}$ and combines them using a series OF NAND gates 49. The outputs of the NAND gates are connected to inputs of NOR gates 50. The $\overline{RR}$ signal normally at a one level is also connected to an input of each NOR gates 50; however, it has no effect on the output of the gates because it is at a one level. The output of gate 50a is connected to the input of an inverter 51. The outputs of gates 50a, 50b, 50c and inverter 51 form a true binary number corresponding to the selected quantity. The binary number is loaded into flip-flops 52, a zero is loaded directly into a set input s and a one is loaded indirectly through NAND gates 53 into a clear input c. The true binary number appears on the $\overline{Q}$ outputs of the flip-flops 52. When a rocket release is commanded the $\overline{RR}$ signal goes to zero and the outputs of the NOR gates 50 are forced to a one level and the outputs of NAND gates 53 are also forced to a one level thereby preventing any changes in the state of the flip-flops 52 thereby locking in the selected quantity. A NAND gate 54 receives zero level count pulses and passes them to flip-flops 52 which are interconnected to count down in the manner of a typical down counter. A NAND gate 55 is connected to the Q outputs of flip-flops 52b, 52c, and 52d and to the $\overline{Q}$ output of flip-flop 52a. NAND gate 55 senses when these outputs are all at a one level, a condition that exists when the binary number is one, and provides a zero level single weapon signal. A NAND gate 56 is connected to the Q output of all the flip-flops 52 and senses when all the outputs are at a one level, a condition that exists when the binary number is zero, and provides a zero level disable signal when no more rockets are to be fired. A NOR gate 57 is connected to the A, B, and C signals and provides a zero level output when all the rockets are to be fired. Gate 54 is connected to the output of gate 57 and does not pass the count pulses when the output of gate 57 is zero. Thus when all the rockets are to be fired the flip-flops do not receive the count pulses and do not count down and gate 56 does not provide the disable signal.

Referring to FIG. 4C the intervalometer logic 16 receives the rocket release signal, RR, and the complement thereto $\overline{RR}$ from station logic 17 and the disable signal from quantity logic 18. A cock circuit 25 consisting of a relaxation type oscillator generates basic clocking signals for the system. The oscillator receives the rocket release RR and disable signals and is turned on by the rocket release signal RR and generates pulses at a fix frequency $f$. The clock circuit has two serially connected monostable circuits used to form a gate to pass the oscillator pulses. The monostable circuits do not pass the pulses if they are not of the proper frequency. This is a safety feature which prevents the firing of rockets at too close an interval. Certain rockets have proximity fuzes and will detonate if they are within a certain proximity of other rockets. Clock circuit 25 stops emitting pulses when the rocket release signal disappears or when it receives the disable signal from the quantity logic 24. A frequency divider 26 receives the pulses from clock circuit 25 and the rocket release signal and has two outputs providing a fast rate signal consisting of square waves at one eighth of the frequency of the clock signal and a fire pulse signal consisting of inverted square waves at one sixteenth the frequency of the clock signal. An output switching and delay circuit 27 receives the rocket release signal RR and its complement $\overline{RR}$ and is responsive thereto for providing a delayed signal for gun system interruption. The gun system interruption signal prevents firing of aircraft guns while the rockets are being fired and has a 300 millisecond delay to inhibit gun firing after the rocket release signal is discontinued. The delayed gun interruption signal is needed because the shells from the gun travel faster than the rockets and could cause premature rocket detonation.

Figure 6:
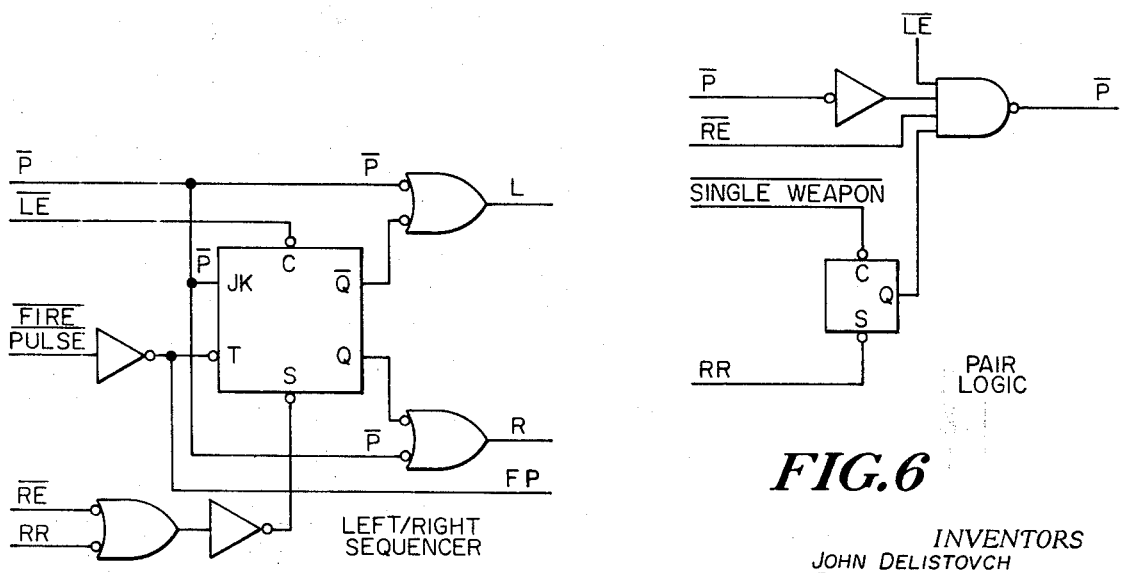
FIG. 6 is a logic diagram of a pair logic circuit shown in FIG. 4.

Referring to FIG. 4B the station logic 17 is responsive to commands from the control panel and also to empty signals from the fire pulse directors for routing fire pulses to the proper fire pulse directors. A level translation circuit 28 is located within the station logic 17 and receives a 28 volt DC rocket release signal from the control stick and provides the rocket release signal RR, corresponding to the input signal but reduced to a 5 volt DC level and a zero level signal $\overline{RR}$ corresponding to the complement of signal RR. Translation circuit 28 receives the 28 volt DC pair signal from pairs select switch 5, a right empty signal from a right inboard fire pulse director 3c and a left empty signal from the left inboard fire pulse director 3b and provides zero level signals $\overline{P}$, $\overline{RE}$, and $\overline{LE}$ corresponding to the complement of the received signals. A pair logic circuit 29, of a type as shown in FIG. 6, receives the $\overline{P}$, $\overline{RE}$, $\overline{LE}$, RR and single rocket signals to pass the $\overline{P}$ signal when a pair mode is selected. The signal $\overline{P}$ is only passed by the pair logic when the $\overline{LE}$, $\overline{RE}$ and single rocket signals are absent.

Figure 7:
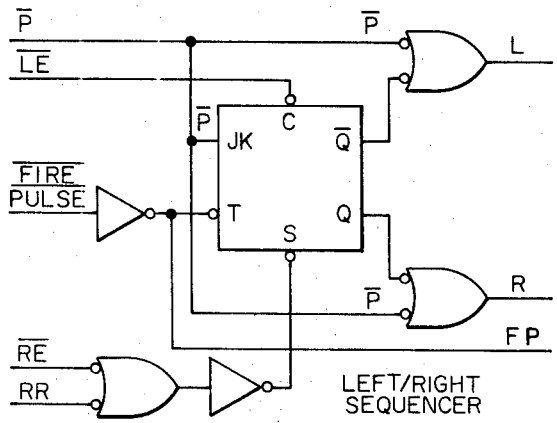
FIG. 7 is a logic diagram of a left/right sequencer shown in FIG. 4.

A left/right sequencer 30, constructed as shown in FIG. 7, receives the fire pulses RR, $\overline{RE}$, $\overline{LE}$ and $\overline{P}$ signals and provides a signal FP corresponding to the fire pulses and signals L and R for directing the FP signal to the proper fire pulse director. The sequencer is responsive to the $\overline{P}$ signal to provide the L and R signals simultaneously thus resulting in the release of pairs. If the $\overline{P}$ signal is not present the sequencer provides alternate L and R signals. The presence of a $\overline{LE}$ signal cause the R signal to be present and the L signal inhibited. Likewise a $\overline{RE}$ signal causes the sequencer to inhibit the R signal and provide the L signal. Thus if one side of the aircraft is empty of the selected rocket type the sequencer limits all rocket firings to the opposite side.

An output switching circuit 31 of the type shown in FIG. 8 is responsive to the signals from the left/right sequencer 30, the pair signal $\overline{P}$, the disable signal, the $\overline{RE}$ and $\overline{LE}$ signals and the fast rate signal for providing sequential left/right fire pulses to the fire pulse directors when a single mode is selected and simultaneous pulses to both left and right fire pulse directors when the pair mode is selected. The fire pulses continue until the disable signal arrives from the quantity logic or an empty signal is received from one of the fire pulses directors. When an empty signal is received the fire pulses are only provided for the opposite side of the aircraft. During single mode operation output switching circuit 31 provides $\overline{count}$ pulses in response to the fire pulses to the rocket counters 8 for down counting rocket inventory and to the decoder and down counter 24 in the quantity logic 18. In pair mode operation each $\overline{count}$ pulse is modulated into 2 pulses by the fast rate signal received from the frequency divider 26.

These modulated pulses decrease the rocket counter and the down counter by a quantity of 2 thus the rocket counter continues to display the correct quantity.

Figure 4D:
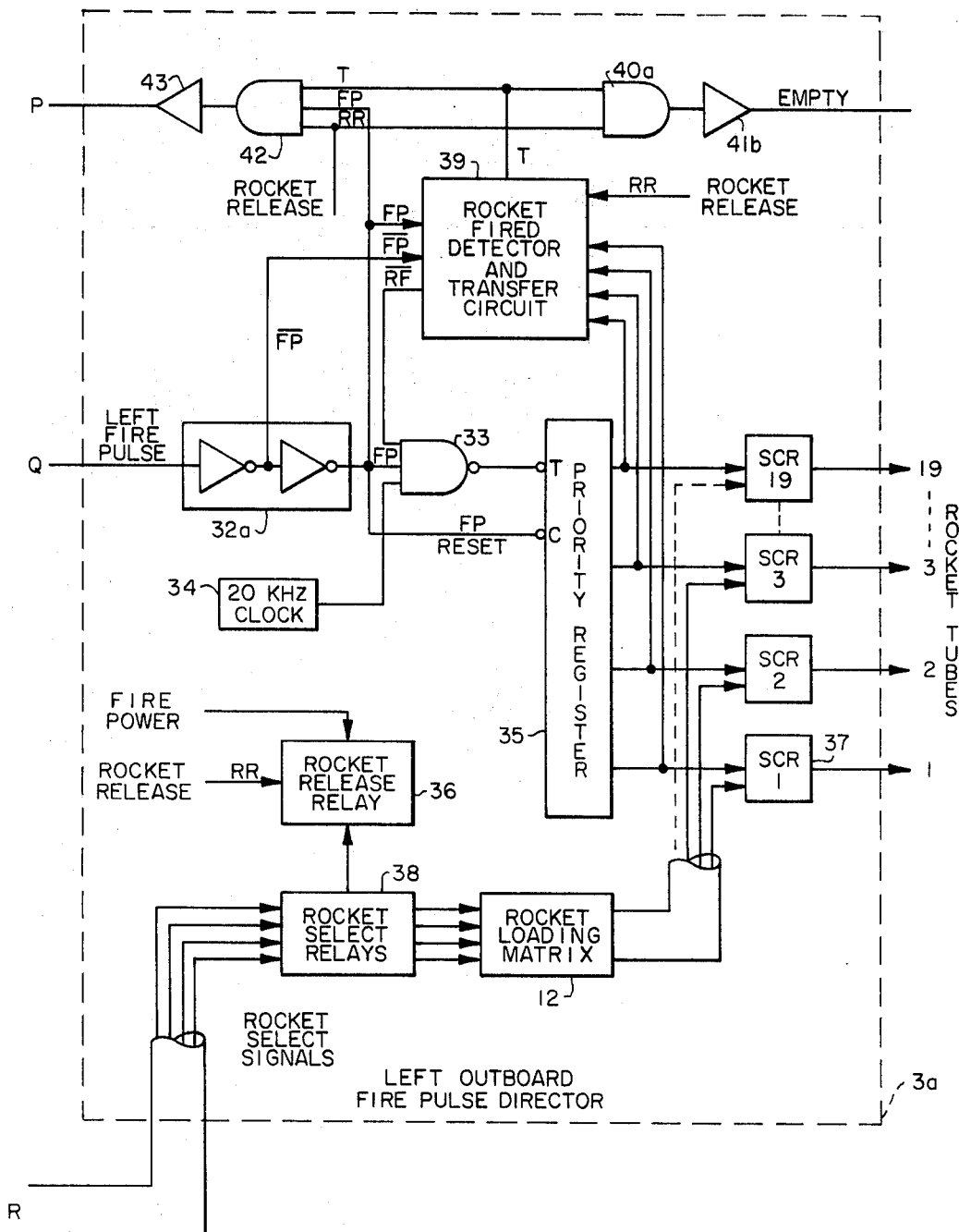

Referring to FIG. 4D the left outboard fire pulse director 3a is connected to the station logic 17 and receives the left fire pulses therefrom and is also connected to the control panel 1 and receives the rocket select signals.

A translation circuit 32a receives the left fire pulses and is responsive thereto for providing a fire pulse signal FP and its complement $\overline{RP}$. A 20 kHz. clock 34 comprising a complementary unijunction transistor oscillator provides scanning pulses for rocket firing. An AND gate 33 receives the 20 kHz. clock pulses and the FP signal and a signal $\overline{RF}$. The $\overline{RF}$ signal is normally at a one level until a rocket firing is detected at which time it switches to a zero level. AND gate 33 is responsive to the FP and $\overline{RF}$ signals for passing the scanning pulses to a terminal T of a priority register 35 when the FP signal is present and the $\overline{RF}$ signal is at a one level. Priority register 35 comprises a 19-bit shift register having a serial input and parallel output and functions to direct the scanning pulses sequentially to nineteen parallel output terminals. Nineteen separate SCR's 37 are connected to the 19 outputs of the priority register 35 and are responsive to the scanning pulses therefrom for passing fire power to the associated rocket tubes. The SCR's 37 are selectively energized by rocket select relays 38 and the rocket loading matrix 12 which is programmed to correspond to the pod loading. When a rocket is selected by activation of the rocket selection switch 9 only those SCR's connected to a rocket of the selected type in the rocket pods will be energized through the rocket select relays and the rocket loading matrix. The priority register 35 sequentially applies the scanning pulses from the 20 kHz. clock to each of the SCR's 37. If an SCR is energized the scanning pulses cause the associated rocket to fire and a rocket fired detector and transfer circuit 39 senses the fire current and provides a zero level $\overline{RF}$ signal to AND gate 33 thereby disabling the AND gate before the next pulse from the 20 kHz. clock reaches the priority register.

The rocket fired detector and transfer circuit 39 also receives the rocket release signal RR and FP signal and its complement $\overline{RP}$ and is responsive to a trailing edge of the FP signal to change the $\overline{RF}$ signal to a one level and thereby reset and enable AND gate 33. Priority register 35 has a terminal C for receiving the FP signal and is responsive to the trailing edge of the FP signal to reset the register after the signal has passed. The above process continues until the rocket pod is depleted of the selected rocket or the selected quantity of rockets have been released.

The rocket fired detector and transfer circuit 39 is also responsive to the signals for providing a transfer signal T when output 19 of priority register 35 provides a scanning pulse and a rocket has not fired.

Referring to FIG. 9 there is shown a rocket fired detector and transfer circuit. Diodes 44 have cathodes connected to the inputs of the corresponding SCR's and anodes connected to a first input of a flip-flop 45. When a rocket fires the SCR current drain appears as a zero level signal at the first input of the flip-flop. Flip-flop 45 has a second input receiving the FP signal. The flip-flop is responsive to the input signals for providing an output signal $\overline{RF}$ which is normally at a one level and becomes zero when a rocket fires.

A delay and inverter circuit 46 receives the $\overline{FP}$ signal and provides a delayed FP signal which is at a one level when the $\overline{FP}$ signal is at a zero level. A NAND gate 47 receives the FP and $\overline{RF}$ signals and the scanning pulse from output 19 of the priority register and provides an output signal at a one level when any one of the inputs is zero and a zero level when all the inputs are at a one level. A flip-flop 48 receives the output signal from gate 47 and the RR signal and is responsive thereto for providing a transfer signal T at a one level when a rocket does not fire.

Referring to FIG. 4D, AND gate 40a has one input connected to the rocket fired detector and transfer circuit 39 for receiving the transfer signal T and second input for receiving the rocket release signal RR. AND gate 40a is responsive to the signals for providing an empty signal to a level translator 41a which has an output providing a 28 volt DC signal when the associated rocket pod is empty of the selected rocket.

An AND gate 42 receives the transfer signal, the FP signal, and the rocket release signal RR and passes the transfer signal T in response thereto. A level translation circuit 43 receives the transfer signal and translates the signal to a 28 volt DC level. The left inboard fire pulse director 3b has a corresponding level translation circuit 32b which receives the transfer signal from the left outboard fire pulse director. Left inboard fire pulse director 3b has an output from level translator 41b providing a left empty signal for the station logic 17.

A rocket release relay 36 receives rocket fire power from the aircraft and is responsive to the rocket release signal to pass the fire power to the rocket select relays 38. The rocket select relays 38 are responsive to the rocket select signals to pass the fire power to the corresponding input of the rocket loading matrix 12. The rocket loading matrix passes the fire power to each SCR having a corresponding rocket attached thereto. When the rocket select relays are not activated they provide a ground to the matrix input to prevent inadvertent firing of the rockets.

The present invention has a solid state firing device and thus provides for mix loading of rocket pods with up to four different types of rockets. The system provides for selection of any rocket type regardless of the loading sequence, delivery mode or quantity or rockets to be fired. The system has built-in safety provisions to prevent firing of unsafe combinations of rockets and also an inventory display showing remaining rockets of each type. The system is adaptable to 7 or 19 round pods and to numerous types of aircraft.

While one embodiment of the invention has been illustrated and described in detail, it is to be expressly understood that the invention is not limited thereto. Various changes may be made in the design and arrangement of the parts without departing from the spirit and scope of the invention as the same will now be understood by those skilled in the art.

What we claim is:

1. For a rocket system adapted for use in conjunction with other weapons systems, the rocket system having rocket pods randomly loaded with a plurality of rocket types, a rocket release device, comprising:

means for selecting a rocket type and for providing a corresponding signal;

means for providing a rocket release signal;

means connected to the rocket type selecting signal means and to the rocket release signal means and responsive to the signals therefrom for providing fire power for rockets of the selected type;

release means connected to the rocket release signal means and to the fire power means and responsive to the rocket release signal for applying the fire power to a rocket of the selected type which releases the rocket;

interlock means connected to the rocket system and to the other weapons systems for providing an inhibit signal to the other weapon systems when the rocket is released;

means for selecting a quantity or rockets and for providing a corresponding signal;

the release means connected to the quantity signal means and to the fire power means and responsive to the quantity release signal for applying the fire power to the quantity of rockets which releases the rockets;

intervalometer means connected to the release signal means, the release means and the quantity signal means and responsive to the rocket release signal and the quantity signal for providing a number of sequential fire pulses corresponding to the quantity signal, the release means being responsive to the fire pulses to release rockets of the selected type, said intervalometer means being effective for spacing the fire pulses to prevent releasing rockets at unsafe intervals;

said release means including a priority register means for distributing each fire pulse sequentially to each rocket until a rocket of the selected type is released; and rocket fired detection means for preventing the sequential distribution of a fire pulse after a rocket has been fired.

2. A system as described in claim 1, additionally comprising fire pulse transfer means for detecting when a rocket does not fire and transferring the fire pulse to another rocket pod.

3. A rocket system release device for an aircraft having a rocket pod on each side randomly loaded with a plurality of rocket types and adapted for use with other weapons systems, comprising:

means for providing a rocket release signal;

means for selecting a rocket type and providing a signal corresponding thereto;

means for selecting a quantity of rockets to be released and providing a signal corresponding thereto;

intervalometer means responsive to the rocket release signal for providing sequential fire pulses at predetermined safe intervals when the rocket release signal is present;

station logic means connected to the intervalometer means and receiving the fire pulses therefrom for providing alternate left and right fire pulses and rocket count pulses in response to the fire pulses;

indicating means connected to the rocket type selecting signal means and the station logic means and responsive to the rocket selection signal and the rocket count pulses for indicating rocket inventory;

quantity logic means connected to the quantity selecting signal means and the station logic means for down counting the quantity signal in response to rocket count pulses and providing a down quantity signal;

means for providing a disable signal when the quantity signal corresponds to zero, the intervalometer means being responsive to the disable signal to stop providing fire pulses;

fire pulse director means for each rocket pod connected to the station logic means, the release signal means and the selecting signal means and receiving the associated fire pulses, the rocket release signal, and the rocket select signal for releasing one of the selected type of rockets in response to each fire pulse; and interlock means connected to the rocket system and to the other weapons systems for providing an inhibit signal to the other weapons systems when the one rocket is released.

4. A system as described in claim 3, in which the fire pulse director means additionally comprises means for providing an empty signal if no rocket is released, the station logic means being responsive to the empty signal to provide a fire pulse to the fire pulse director means associated with the rocket pod on the other side of the aircraft.

5. A system as described in claim 4, additionally comprising:

means for selecting a simultaneous release of a rocket from each side of the aircraft and providing a pairs signal, the station logic means is responsive to the pairs signal to provide simultaneous left and right fire pulses for each fire pulse received.

modulating means responsive to the pairs signal for modulating each rocket count pulse form two pulses, whereby the quantity signal and the inventory indicating means are down counted by two for each fire pulse; and means responsive to the down counted quantity signal for providing a single rocket signal when the down counted quantity signal corresponds to one; and means responsive to the single rocket signal and the empty signal for inhibiting the pairs signal, whereby the station logic means only provides a single fire pulse and the modulating means stops modulating the rocket count pulses.

6. A system as described in claim 3, adapted for an aircraft having inboard and outboard rocket pods on each side, in which:

an outboard fire pulse director means receives the fire pulses from the station logic and includes means providing a transfer pulse if no rocket is released; and an inboard fire pulse director means is responsive to the transfer pulse to fire a rocket of the selected type and includes means for providing an empty signal if no rocket is released, the station logic means being responsive to the empty signal to provide a fire pulse to the outboard fire pulse director means associated with the outboard rocket pod on the other side of the aircraft.